US008985292B2

(12) United States Patent
Eguchi et al.

(10) Patent No.: US 8,985,292 B2
(45) Date of Patent: Mar. 24, 2015

(54) CLUTCH OPERATING DEVICE (75) Inventors: Yasuhiko Eguchi, Yao (JP); Hiroaki Kato, Neyagawa (JP)

(73) Assignee: EXEDY Corporation, Osaka (JP)

( * ) Notice: Subject to any disclaimer, the term of this patent is extended or adjusted under 35 U.S.C. 154(b) by 124 days.

(21) Appl. No.: 13/806,951

(22) PCT Filed: May 31, 2011

(86) PCT No.: PCT/JP2011/062514
§ 371 (c)(1),
(2), (4) Date: Dec. 26, 2012

(87) PCT Pub. No.: WO2012/002092
PCT Pub. Date: Jan. 5, 2012

(65) Prior Publication Data
US 2013/0098734 A1     Apr. 25, 2013

(30) Foreign Application Priority Data
Jun. 30, 2010   (JP) .................. 2010-150220

(51) Int. Cl.
*F16D 23/12*   (2006.01)
*F16D 28/00*   (2006.01)
(52) U.S. Cl.
CPC .......... *F16D 23/12* (2013.01); *F16D 2023/123* (2013.01); *F16D 28/00* (2013.01)
USPC ....... 192/52.4; 192/82 R; 192/84.6; 192/84.7; 192/99 S (58) Field of Classification Search
USPC .................. 192/84.7, 52.4; 74/106
See application file for complete search history.

(56) References Cited

U.S. PATENT DOCUMENTS

| 1,540,247 | A | * | 6/1925 | Bowman ................ 192/89.29 |
| 2,080,079 | A | * | 5/1937 | Johnson ................ 192/89.29 |
| 2,280,357 | A | * | 4/1942 | Spase .................... 192/70.27 |
| 4,878,396 | A | * | 11/1989 | Grunberg ................ 192/99 S |
| 7,124,871 | B2 | * | 10/2006 | Friedmann et al. ........ 192/99 S |

FOREIGN PATENT DOCUMENTS

| JP | S55-102429 U | 7/1980 |
| JP | H09-53650 A | 2/1997 |
| JP | 2010-90949 A | 4/2010 |

* cited by examiner

*Primary Examiner* — Rodney H Bonck
(74) *Attorney, Agent, or Firm* — Global IP Counselors, LLP (57) ABSTRACT A clutch operating device includes a drive mechanism and an assist mechanism. The drive mechanism is configured to generate a driving force and transmit the driving force to a clutch device. The assist mechanism is a mechanism for assisting the drive mechanism and includes a pressure mechanism and a toggle mechanism. The pressure mechanism is configured to generate a pressing force. The toggle mechanism is configured to convert the pressing force of the pressure mechanism into an assist force gradually increased from a power blocked state to a power transmitted state of the clutch device.

7 Claims, 8 Drawing Sheets

FIG. 8

CLUTCH OPERATING DEVICE

CROSS-REFERENCE TO THE RELATED APPLICATIONS

This U.S. national phase application claims priority to Japanese Patent Application No. 2010-150220 filed on Jun. 30, 2010. The entire disclosure of Japanese Patent Application No. 2010-150220 is hereby incorporated herein by reference.

BACKGROUND

1. Technical Field

The present invention relates to a clutch operating device for operating a clutch device.

2. Background Art

In conventional manual transmissions, a clutch device is disposed between an engine and a transmission, while a shift lever of a driver's seat and the transmission are mechanically coupled through a link mechanism such as a control rod. In gear shifting, the shift lever is operated while a clutch pedal is pressed down for causing the clutch device to block transmission of power to be executed between the engine and the transmission. Therefore, when gear shifting is frequently required, a series of operations become a large burden on a driver.

In view of the above, to reduce a driver's burden regarding a shift operation, automatic transmissions, which is provided with a clutch actuator automatically coupling/decoupling a clutch device, have been proposed whereby a gear shifting operation can be executed without pressing down a clutch pedal.

CITATION LIST

Patent Literature

PTL 1: Specification of U.K. Patent Application Publication No. 2313885

SUMMARY

Technical Problems

Normal closed type clutch devices are generally used as clutch devices for the aforementioned automatic transmissions. However, automatic transmissions using a normal open type clutch device have also been developed in recent years.

In the case of the normal open type, the clutch device is decoupled while operating force is not being applied to the clutch device from a clutch operating device. In coupling the clutch device, a pressure plate is pressed by a drive mechanism through a lever and a clutch disc is interposed between the pressure plate and a flywheel. As a result, power is transmitted to an input shaft of a transmission through the clutch disc.

With such structure, unlike the normal close type, in the normal open type clutch device, the pressing force acting on the clutch disc (clutch load) depends on the operating force to be transmitted thereto from the clutch operating device. Therefore, a large operating force is required in a clutch coupled state, and consequently a load of an actuator inevitably increases.

In view of the above, an assist mechanism for assisting the operating force has been proposed to reduce the load of the actuator (see e.g., Patent Literature 1). The assist mechanism described in Patent Literature 1 is configured to generate assist force using a cam.

In using the cam, however, the cam is required to be designed suitably for a product in accordance with the specification of the product. Therefore, it is difficult to make the cam compatible with a variety of clutch devices.

It is an advantage of the present invention to provide a clutch operating device that can reduce driving load and is also easily compatible with a variety of clutch devices.

Solution to Problems

A clutch operating device according to the present invention is a device for operating a clutch device and includes a drive part and an assist mechanism. The drive part is configured to generate a driving force and transmit the driving force to the clutch device. The assist mechanism is a mechanism for assisting the drive part and includes a pressure part and a toggle mechanism. The pressure part is configured to generate a pressing force. The toggle mechanism is configured to convert the pressing force into an assist force gradually increasing from a power blocking state to a power transmitting state of the clutch device.

Advantageous Effects of Invention

In the clutch operating device, the toggle mechanism is employed in the assist mechanism. It is thereby possible to easily implement a characteristic of the driving force suitable for a load characteristic of the clutch device. Further, the pressure part and the toggle mechanism are combined, and thereby, a characteristic of the assist force can be regulated only by changing the specification of the pressure part. In other words, it is possible to easily implement the clutch operating device compatible with a variety of clutch devices. Therefore, the present clutch operating device can reduce a driving load while being easily compatible with a variety of clutch devices.

DETAILED DESCRIPTION OF THE PREFERRED EMBODIMENTS

First Embodiment

<Structure of Clutch Device>

Figure 1:
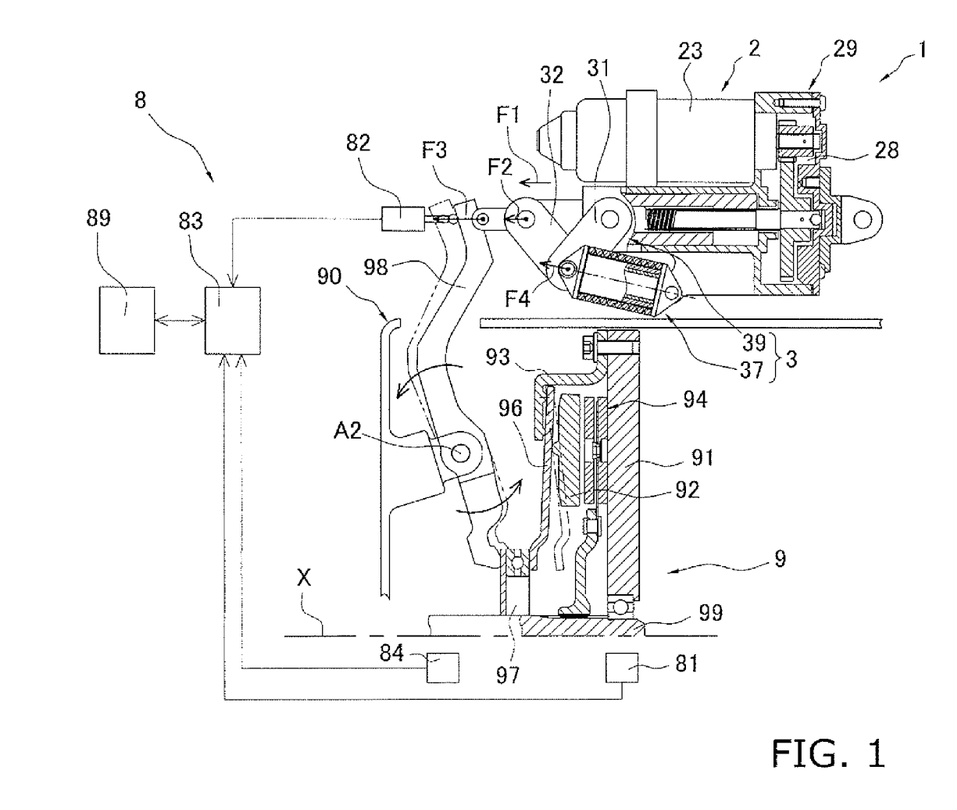
FIG. 1 is a schematic structural diagram of a clutch device and a clutch operating device (a first exemplary embodiment).

As illustrated in FIG. 1, a clutch device 9 is an exemplary device for transmitting power from an engine (not illustrated in the figure) to a transmission (not illustrated in the figure) and is, for instance, fixed to a flywheel 91 of the engine. The flywheel 91 is rotated about a rotary axis X. An axial direction hereinafter refers to a direction arranged in parallel to the rotary axis X.

The clutch device 9 is so-called a normal open type device. Therefore, power is blocked from being transmitted from the engine to the transmission, while operational force is not being applied to the clutch device 9 from a clutch operating device 1 (to be described). The clutch operating device 1 will be described below in detail.

As illustrated in FIG. 1, the clutch device 9 includes a clutch cover 93, a pressure plate 92, a clutch disc 94, a pressure lever 96, an engaging bearing 97, and a clutch lever 98.

The clutch cover 93 is fixed to the flywheel 91. The pressure plate 92 is supported by the clutch cover 93 while being unitarily rotatable therewith and axially movable. The pressure plate 92 is coupled to the clutch cover 93 by a plurality of strap plates (not illustrated in the figures) while being unitarily rotatable therewith. Further, the pressure plate 92 is elastically coupled to the clutch cover 93 in the axial direction by the strap plates.

The clutch disc 94 is disposed between the flywheel 91 and the pressure plate 92, and is interposed axially between the flywheel 91 and the pressure plate 92 when the clutch device 9 is coupled. The pressure lever 96 is a roughly annular plate and is supported by the clutch cover 93 while being elastically deformable in the axial direction. The pressure lever 96 has small elastic force and relatively small force is required for elastically deforming the pressure lever 96. The inner peripheral part of the pressure lever 96 can be axially pressed inside by the clutch lever 98.

The engaging bearing 97 eliminates difference in rotation between the pressure lever 96 and the clutch lever 98. The engaging bearing 97 is disposed between the inner peripheral part of the pressure lever 96 and the tip of the clutch lever 98.

The clutch lever 98 is supported by a housing 90 while being rotatable about a rotary axis A2. When the clutch device 9 is coupled, the clutch lever 98 is driven and rotated about the rotary axis A2 by the clutch operating device 1. As a result, the clutch lever 98 axially presses the pressure plate 92 through the engaging bearing 97 and the pressure lever 96. When the clutch load of pressing the pressure plate 92 then becomes a predetermined value or greater, the clutch device 9 is set to be in a power transmitting state.

<Structure of Clutch Operating Device>

The clutch operating device 1 is a device for operating the clutch device 9 and switches the clutch device 9 into either a power transmitting state or a power blocking state, for instance, based on an operating signal to be outputted from a transmission ECU 89. Here, the power blocking state means a state that transmission of power through the clutch device 9 is being completely blocked, whereas the power transmitting state means a state that transmission of power through the clutch device 9 is being executed. In the power transmitting state, the rotational speed of the flywheel 91 and that of an input shaft 99 of the transmission are the same.

The clutch operating device 1 can be applied to a variety of clutch devices with different specifications. However, the clutch operating device 1 will be herein explained by exemplifying the aforementioned clutch device 9 as an operating target of the clutch operating device 1.

As illustrated in FIG. 1, the clutch operating device 1 includes a drive mechanism 2 (an exemplary drive part), an assist mechanism 3 and a control unit 8.

The drive mechanism 2 is a drive source for driving the clutch lever 98 of the clutch device 9 and directly transmits driving force to the clutch lever 98. Here, as illustrated in FIG. 2, force to be inputted into the clutch lever 98 from the drive mechanism 2 is defined as a driving force F1 (an exemplary driving force of the drive part); force to be inputted into the clutch lever 98 from the assist mechanism 3 through the drive mechanism 2 is defined as an assist force F2 (an exemplary operating force of the clutch device); and the net force of the driving force F1 and the assist force F2 is defined as an operating force F3 for operating the clutch device 9.

Figure 2:
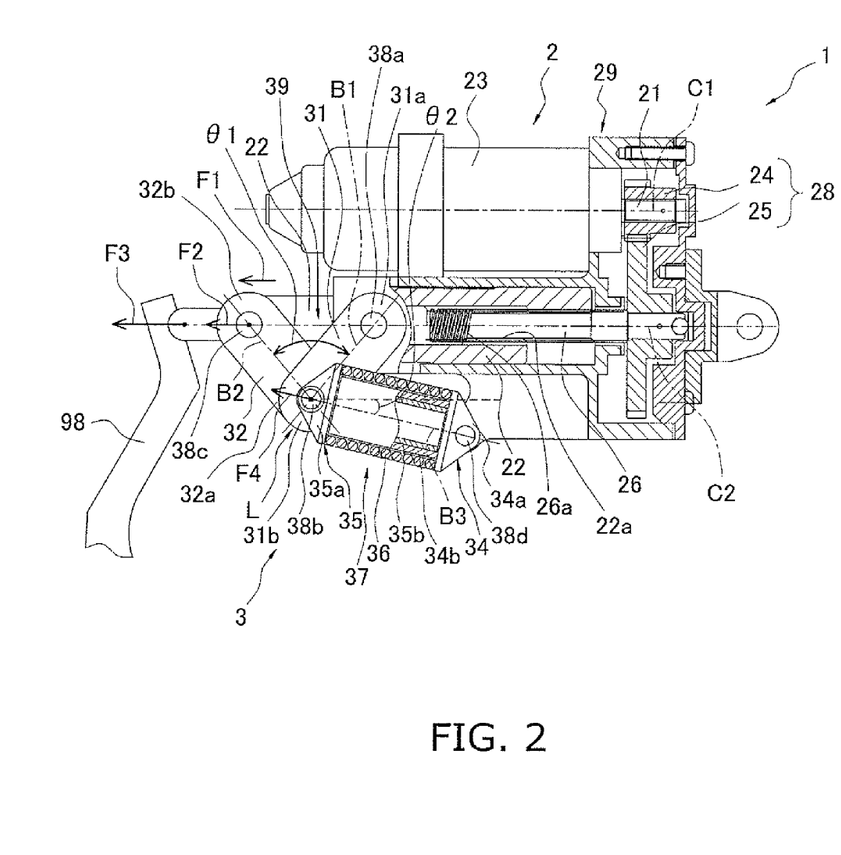
FIG. 2 is a structural diagram of an assist mechanism (the first exemplary embodiment).

As illustrated in FIG. 2, the drive mechanism 2 generates the driving force F1 for driving the clutch device 9. Specifically, the drive mechanism 2 includes a drive motor 23, a reduction mechanism 28, a screw shaft 26, a ball screw 22 (an exemplary output member), and a casing 29. The casing 29 is fixed to, for instance, the housing 90.

The drive motor 23 is a brushless motor, for instance, and includes a drive shaft 21 for outputting rotary driving force. The drive shaft 21 is rotated about a rotary axis C1. In the present exemplary embodiment, the rotary axis C1 is arranged in parallel to the axial direction. The drive motor 23 is fixed to the casing 29. The reduction mechanism 28 is a mechanism for reducing the rotational speed of the drive motor 23 and includes a first gear 24 and a second gear 25. The first gear 24 is fixed to the drive shaft 21. The second gear 25 is meshed with the first gear 24 while being fixed to the screw shaft 26. The first gear 24 and the second gear 25 are disposed inside the casing 29.

The screw shaft 26 is rotatably supported by the casing 29 and has a screw portion 26a. The screw shaft 26 is rotated about a rotary axis C2. The rotary axis C2 is arranged in parallel to the rotary axis C1 and the axial direction. The ball screw 22 is supported by the casing 29 while being movable in the axial direction (i.e., the right-and-left direction in FIGS. 1 and 2). The ball screw 22 makes contact with the clutch lever 98. The ball screw 22 has a screw hole 22a. The screw portion 26a of the screw shaft 26 is screwed into the screw hole 22a. The ball screw 22 is axially moved in conjunction with rotation of the screw shaft 26. Thus, the rotary motion of the screw shaft 26 is converted into a linear motion by the ball screw 22, and the rotary driving force generated in the drive motor 23 is converted into the axial driving force F1.

In the drive mechanism 2, the rotary driving force generated in the drive motor 23 is amplified in the reduction mechanism 28 and is converted into the axial driving force F1 by the screw shaft 26 and the ball screw 22. The driving force F1 is transmitted to the clutch lever 98 through the ball screw 22. It should be noted that the reduction ratio of the reduction mechanism 28 is constant regardless of a stroke S of the drive mechanism 2.

The assist mechanism 3 assists the drive mechanism 2 for reducing the driving load (motor torque) of the drive motor 23. Specifically, the assist mechanism 3 applies the assist force F2 to the clutch lever 98. In the present exemplary embodiment, the assist mechanism 3 is not directly transmitting the assist force F2 to the clutch lever 98 but transmitting the assist force F2 to the clutch lever 98 through the ball screw 22 of the drive mechanism 2. It should be noted that the assist mechanism 3 can directly transmit the assist force F2 to the clutch lever 98.

As illustrated in FIG. 2, the assist mechanism 3 includes a toggle mechanism 39 and a pressure mechanism 37 (an exemplary pressure member).

The toggle mechanism 39 includes a first link member 31 having a plate shape and a second link member 32 having a plate shape. In the present exemplary embodiment, the first link member 31 and the second link member 32 have the same shape.

The first link member 31 has a first end portion 31a and a second end portion 31b. The first end portion 31a is rotatably coupled to the casing 29 of the drive mechanism 2 through a pin 38*a*. The second end portion 31*b* is rotatably coupled to the second link member 32 through a pin 38*b*.

The second link member 32 has a first end portion 32*a* and a second end portion 32*b*. The first end portion 32*a* is rotatably coupled to the second end portion 31*b* of the first link member 31 through the pin 38*b*. The second end portion 32*b* is rotatably coupled to the ball screw 22 through a pin 38*c*. In the present exemplary embodiment, in FIG. 2, the center of the pin 38*a* and that of the pin 38*c* are arranged on the rotary axis C2.

The first link member 31 is disposed while being slanted with respect to the axial direction (an exemplary first direction) along which the ball screw 22 is moved. The second link member 32 is disposed while being slanted with respect to the axial direction. Specifically, in FIG. 2, a line B1 and a line B2 are slanted with respect to the rotary axis C2 where the line B1 is defined as a line connecting the center of the pin 38*a* and that of the pin 38*b* while the line B2 is defined as a line connecting the center of the pin 38*b* and that of the pin 38*c*. In the present exemplary embodiment, an angle θ1 formed between the line B1 and the line B2 is less than 90 degrees in the power blocking state. The angle θ1 gradually increases from the power blocking state to the power transmitting state, and in accordance with this, the reduction ratio of the toggle mechanism 39 also gradually increases.

The pressure mechanism 37 constantly applies a pressing force F4 to the first link member 31 and the second link member 32. The pressure mechanism 37 includes a first pressure member 34, a second pressure member 35, and a coil spring 36. The first pressure member 34 has a first coupling portion 34*a* and a first tubular portion 34*b*. The first coupling portion 34*a* is rotatably coupled to the casing 29 of the drive mechanism 2 through a pin 38*d*. The first tubular portion 34*b* is a tubular portion protruding from the first coupling portion 34*a*. The second pressure member 35 has a second coupling portion 35*a* and a second tubular portion 35*b*. The second coupling portion 35*a* is rotatably coupled to the first link member 31 and the second link member 32 through the pin 38*b*. The second tubular portion 35*b* is a tubular portion protruding from the second coupling portion 35*a*. The center line of the first tubular portion 34*b* is roughly matched with that of the second tubular portion 35*b*. The center line of the first tubular portion 34*b* and that of the second tubular portion 35*b* are herein depicted with a line B3.

The second pressure member 35 is disposed while being slidable with the first pressure member 34. Specifically, the first tubular portion 34*b* is inserted into the second tubular portion 35*b*. The second tubular portion 35*b* guides the first tubular portion 34*b* in a direction arranged along the line B3.

The coil spring 36 is disposed while being compressed between the first coupling portion 34*a* and the second coupling portion 35*a*. The second tubular portion 35*b* is inserted into the coil spring 36. The coil spring 36 is supported by the second tubular portion 35*b* while being elastically deformable in a direction (an exemplary second direction) arranged along the line B3. The pressure mechanism 37 is disposed while being extendable and contractable in the direction arranged along the line B3. The pressing force F4 of the pressure mechanism 37 acts on a direction arranged in parallel to the line B3. In FIG. 2, an angle θ2 is an acute angle in the power blocking state where the angle θ2 is defined as an angle formed between the line B3 and the axial direction. The angle θ2 gradually increases from the power blocking state to the power transmitting state.

With the aforementioned structure, the pressure mechanism 37 applies the pressing force F4 to a coupled part L between the first link member 31 and the second link member 32. The pressing force F4 gradually increases from the power blocking state to the power transmitting state by the action of the toggle mechanism 39.

Figure 3:
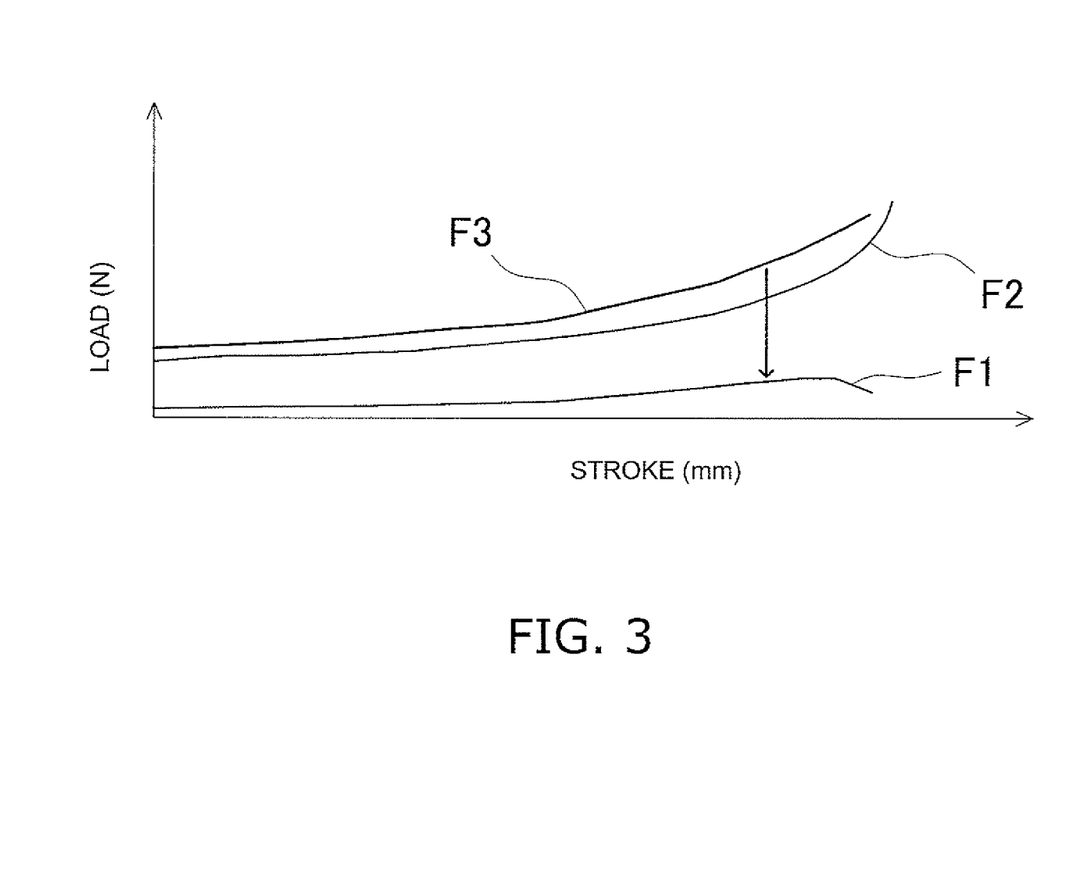
FIG. 3 is a load characteristic diagram of the clutch device and the clutch operating device (the first exemplary embodiment).

The assist mechanism 3 includes the toggle mechanism 39, and therefore, it is possible to implement an assist characteristic that the assist force F2 gradually increases in proportion to increase in the stroke S as represented in FIG. 3. Accordingly, the driving force F1 of the drive mechanism 2 can be reduced and the motor torque of the drive motor 23 can be reduced.

The control unit 8 includes a control device 83, a first rotation sensor 81, a second rotation sensor 84, and a stroke sensor 82. The control device 83 controls the drive motor 23 in accordance with a state of the vehicle. Specifically, the control device 83 controls the drive motor 23 based on an operating signal to be outputted from the transmission ECU 89 (FIG. 1).

The first rotation sensor 81 detects the rotational speed of the flywheel 91. The second rotation sensor 84 detects the rotational speed of the input shaft 99 unitarily rotated with the clutch disc 94. The stroke sensor 82 detects the stroke of the clutch lever 98 (i.e., the stroke S of the drive mechanism 2). In the present exemplary embodiment, the stroke S is the same as the displacement of the ball screw 22 of the drive mechanism 2.

The control device 83 is electrically connected to the first rotation sensor 81, the second rotation sensor 84, and the stroke sensor 82. The detection signals of the first rotation sensor 81, the second rotation sensor 84, and the stroke sensor 82 are inputted into the control device 83 at predetermined periods. The control device 83 controls the action of the drive motor 23 using the respective detection signals.

For example in clutch releasing, when receiving an operating signal to be outputted from the transmission ECU 89, the control device 83 controls the driving of the drive motor 23 so that the clutch lever 98 is rotated to a predetermined release position. The control device 83 determines whether or not the clutch lever 98 is located in a predetermined position based on the detection signal of the stroke sensor 82.

On the other hand, in clutch coupling, the control device 83 controls the driving of the drive motor 23 so that the clutch lever 98 is rotated to an engaging position. In the present exemplary embodiment, the engaging position of the clutch lever 98 is determined based on whether or not the rotational speed of the flywheel 91 and that of the input shaft 99 are equivalent to each other. In the present exemplary embodiment, the rotational speed of the flywheel 91 and that of the input shaft 99 are determined based on the detection signal of the first rotation sensor 81 and that of the second rotation sensor 84.

<Actions of Clutch Operating Device>

The action of the clutch operating device 1 explained above will be explained.

In the power blocking state as illustrated in FIG. 1, the driving force F1 to be generated in the clutch operating device 1 is not being transmitted to the clutch lever 98. The pressure plate 92 is thereby held in a position away from the clutch disc 94 by the elastic force of the strap plates. Under the condition, the rotation of the flywheel 91 is not transmitted to the clutch disc 94, and therefore, a gear shifting action is enabled in the transmission.

In switching the clutch device 9 from the power blocking state to the power transmitting state, the drive motor 23 drives the clutch lever 98 based on a control signal of the control device 83. Specifically, the drive shaft 21 of the drive motor 23 starts being rotated and the rotation of the drive shaft 21 is transmitted to the screw shaft 26 through the reduction mechanism 28. When the screw shaft 26 is rotated, the ball screw 22 is axially moved. As a result, the clutch lever 98 is pressed by the ball screw 22 and the clutch lever 98 is rotated about the rotary axis A2.

When rotated about the rotary axis A2, the clutch lever 98 presses the pressure lever 96 towards the flywheel 91 and the pressure plate 92 is pressed towards the flywheel 91 through the pressure lever 96. As a result, the clutch disc 94 is pressed onto the flywheel 91 by the pressure plate 92, and the clutch disc 94 is interposed between the pressure plate 92 and the flywheel 91. Power is transmitted from the engine to the transmission through the clutch disc 94.

When the clutch lever 98 is driven by the drive mechanism 2, the driving force F1 is transmitted to the clutch lever 98 through the ball screw 22.

In addition to the above, the assist force F2 is being applied to the ball screw 22 from the assist mechanism 3. Specifically, the pressure mechanism 37 is applying the pressing force F4 to the coupled part L, and therefore, the pressing force F4 is transmitted to the ball screw 22 through the toggle mechanism 39. The magnitude of the assist force F2 is herein changed in accordance with the stroke S of the drive mechanism 2 by the amplifying action of the toggle mechanism 39.

Figure 4:
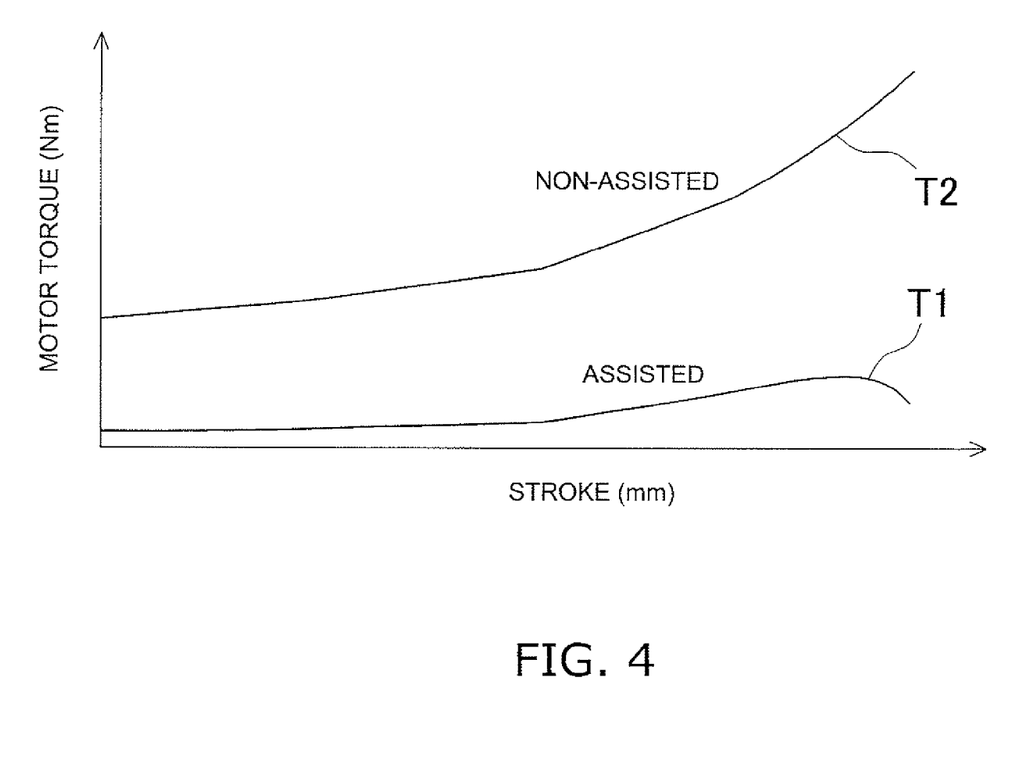
FIG. 4 is a comparative chart of motor torque of a drive mechanism (the first exemplary embodiment).

Specifically, as represented in FIG. 3, the assist force F2 gradually increases in proportion to increase in the stroke S. The reduction ratio of the toggle mechanism 39 acutely increases in the vicinity of the terminal of the stroke S. Therefore, the assist force F2 also acutely increases in the vicinity of the terminal of the stroke S. The assist characteristic is relatively similar to the clutch load characteristic. Therefore, it is possible to obtain the operating force F3 required for keeping the clutch device 9 in the power transmitting state even when the driving force F1 to be generated in the drive mechanism 2 is small. The driving force F1 can be reduced, and therefore, a motor torque T1 of the drive motor 23 can be further reduced than a motor torque T2 to be generated without the assist mechanism 3 as represented in FIG. 4.

As explained above, according to the clutch operating device 1, the assist mechanism 3 includes the toggle mechanism 39. Therefore, the driving load of the drive mechanism 2 can be reduced with a simple structure. Further, the assist characteristic of the assist mechanism 3 can be easily changed by replacing the coil spring 36 with a coil spring having a different characteristic. Therefore, the clutch operating device 1 can reduce the driving load while being easily compatible with a variety of clutch devices.

Second Exemplary Embodiment

In the aforementioned first exemplary embodiment, the assist mechanism 3 is used in combination with the drive mechanism 2 having a constant reduction ratio. However, a final reduction mechanism such as a toggle mechanism can be used for the drive mechanism 2 as well as for the assist mechanism 3. It should be noted in the following explanation that the same reference numeral is used for an element having substantially the same function as a corresponding element in the first exemplary embodiment and the detailed explanation of the element will be hereinafter omitted.

Figure 5:
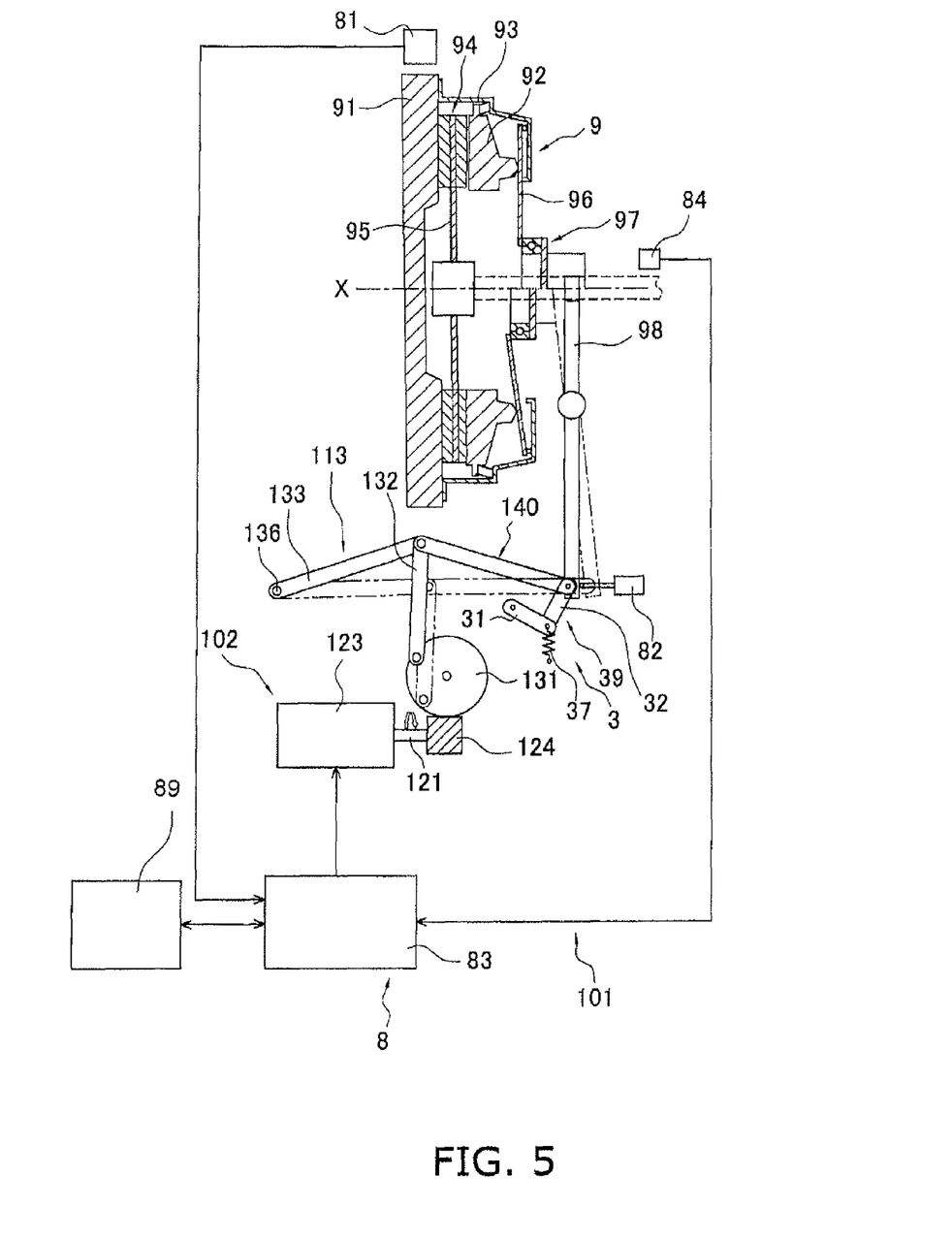
FIG. 5 is a schematic structural diagram of a clutch device and a clutch operating device (a second exemplary embodiment).

As illustrated in FIG. 5, a clutch operating device 101 according to a second exemplary embodiment includes a drive mechanism 102 and the assist mechanism 3.

The drive mechanism 102 includes a drive motor 123, a reduction mechanism 113 and the control unit 8. The drive motor 123 includes a drive shaft 121 for outputting driving force and a drive gear 124. The drive gear 124 is fixed to an end of the drive shaft 121 while being meshed with a worm wheel 131 of the reduction mechanism 113.

The reduction mechanism 113 has a function of converting a rotary motion produced by the drive motor 123 into a linear motion and a function of amplifying the driving force produced by the drive motor 123. Specifically, as illustrated in FIG. 5, the reduction mechanism 113 includes the worm wheel 131 and a toggle mechanism 140.

The worm wheel 131 is a gear for reducing the rotational speed of the drive gear 124 and is meshed with the drive gear 124. The worm wheel 131 is rotatably supported by, for instance, a housing (not illustrated in the figures).

Figure 7:
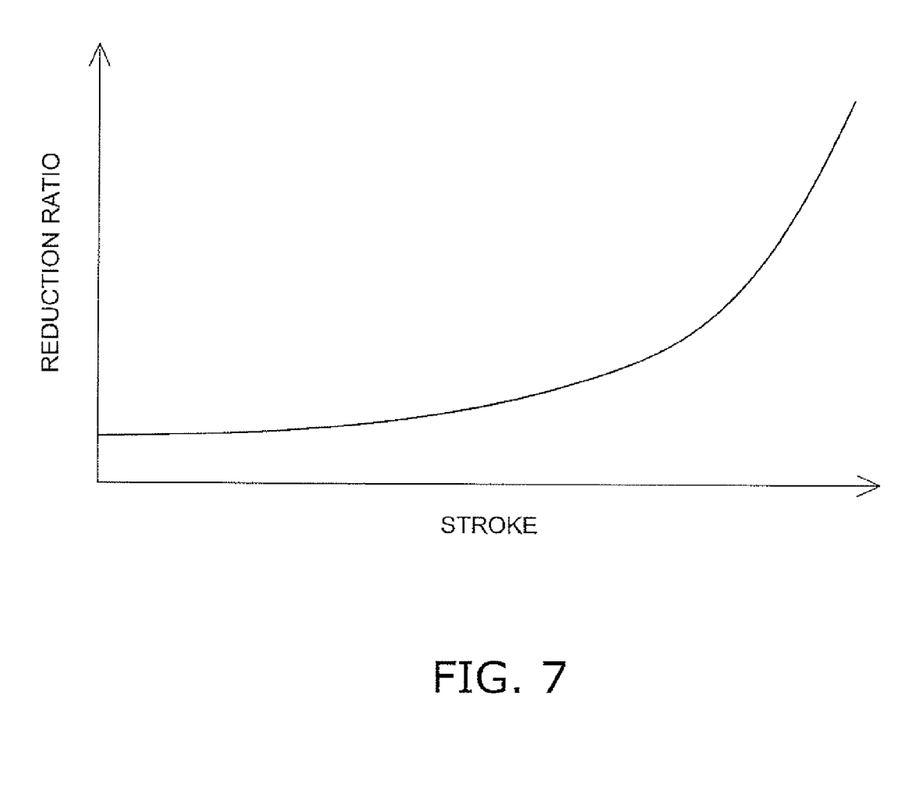
FIG. 7 represents a reduction ratio characteristic of the drive mechanism (the second exemplary embodiment).

The toggle mechanism 140 is so-called a final reduction mechanism that the reduction ratio thereof is changed in accordance with an output driving amount (more specifically, the stroke S of the clutch lever 98). As represented in FIG. 7, the reduction ratio of the toggle mechanism 140 gradually increases in proportion to increase in the stroke S. In other words, the reduction ratio of the toggle mechanism 140 gradually increases from the power blocking state to the power transmitting state of the clutch device 9.

Figure 6:
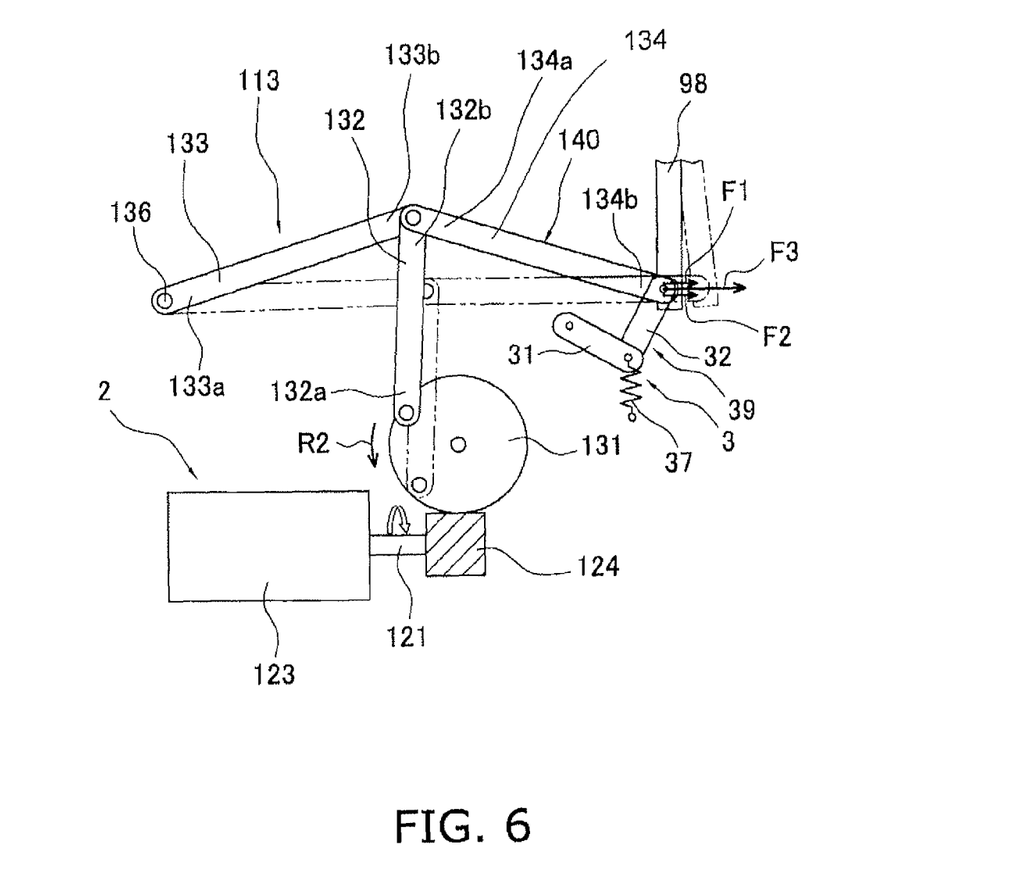
FIG. 6 is a structural diagram of a drive mechanism (the second exemplary embodiment).

When the structure of the toggle mechanism 140 is explained in more detail, as illustrated in FIG. 6, the toggle mechanism 140 includes a first link member 132, a second link member 133, and a third link member 134. A first end portion 132a of the first link member 132 is rotatably coupled to the outer peripheral part of the worm wheel 131. A second end portion 132b of the first link member 132 is rotatably coupled to the second link member 133 and the third link member 134.

A first end portion 133a of the second link member 133 is rotatably coupled to a casing (not illustrated in the figures) by, for instance, a pin 136. A second end portion 133b of the second link member 133 is rotatably coupled to a first end portion 134a of the third link member 134. A second end portion 134b of the third link member 134 makes contact with the clutch lever 98. Further, the end portion of the second link member 32 is rotatably coupled to the second end portion 134b of the third link member 134. Therefore, the assist force F2 of the assist mechanism 3 is transmitted to the clutch lever 98 through the third link member 134.

For example, when the worm wheel 131 is rotated in an R2 direction, the first link member 132 pulls the coupled part between the second link member 133 and the third link member 134. As a result, the second link member 133 and the third link member 134 are stretched between the pin 136 and the clutch lever 98, and the rightward driving force F1 acts on the clutch lever 98. As represented in FIG. 7, the reduction ratio of the drive mechanism 102 gradually increases in proportion to increase in the stroke S and acutely increases in the vicinity of the terminal of the stroke S.

Figure 8:
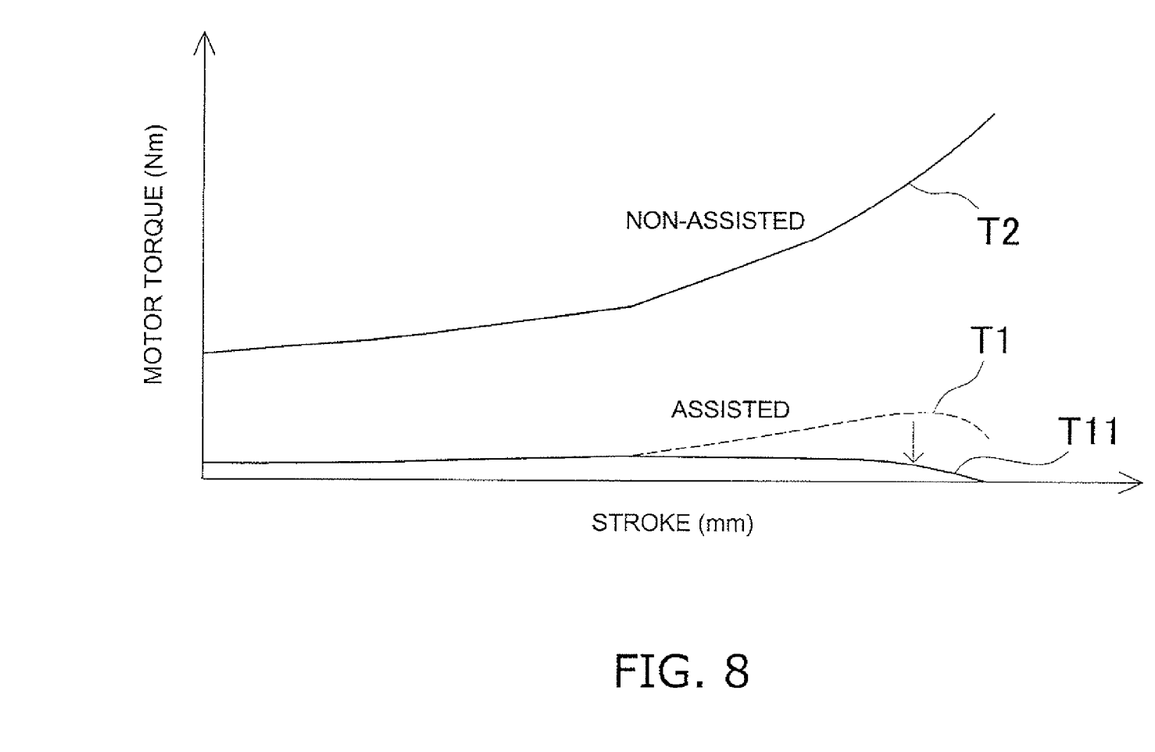
FIG. 8 is a comparative chart of motor torque of the drive mechanism (the second exemplary embodiment).

In the clutch operating device 101, the toggle mechanism 140 is used for the drive mechanism 102 in addition to the toggle mechanism of the assist mechanism 3. Therefore, as represented in FIG. 8, the motor torque of the drive motor 123 can be further reduced (a motor torque T11) compared to the aforementioned first exemplary embodiment.

As described above, in the clutch operating device 101, the driving load of the drive mechanism 102 can be further reduced by combining the drive mechanism 102 using the final reduction mechanism with the assist mechanism 3 using another final reduction mechanism.

Other Exemplary Embodiments

The specific structure of the present invention is not limited to the structures of the aforementioned exemplary embodiments, and a variety of changes and modification can be herein made without departing from the scope of the present invention.

(A) In the aforementioned exemplary embodiments, the clutch device 9 has been exemplified for explaining the clutch device. However, the structure of the clutch device is not limited to the structures of the aforementioned exemplary embodiments. As long as the clutch device is of a normal open type, the aforementioned technique can be applied thereto. For example, a twin clutch using two clutch discs can be assumed as the clutch device.

(B) In the aforementioned exemplary embodiments, the drive mechanism 2 has been exemplified for explaining the drive part. However, the elements of the drive part for generating driving force are not limited to the drive motor 23 and the ball screw 22. For example, other actuators such as a hydraulic cylinder can be employed as the drive part.

(C) The structure of the assist mechanism 3 is not limited to the structures of the aforementioned exemplary embodiments. For example, the toggle mechanism can have any other structure as long as it has a function of converting the pressing force of the pressure part into an assist force that gradually increases from the power blocking state to the power transmitting state of the clutch device.

Further, the pressure mechanism 37 applies the pressing force F4 to the first link member 31 and the second link member 32 of the toggle mechanism 39. However, the pressure mechanism 37 is only required to apply the pressing force F4 to at least either of the first link member 31 and the second link member 32.

(D) The assist mechanism 3 applies the assist force F2 to the clutch lever 98 through a part (the ball screw 22) of the drive mechanism 2. However, the assist mechanism 3 can directly apply the assist force F2 to the clutch lever 98.

(E) The clutch lever 98 can be omitted. In this case, a structure can be considered that the ball screw 22 directly presses the pressure lever 96. Conversely, other mechanism can be disposed between the clutch lever 98 and the drive mechanism 2 (or the drive mechanism 102). For example, a slave cylinder and a master cylinder can be disposed between the clutch lever 98 and the drive mechanism 2.

The invention claimed is:

1. A clutch operating device for operating a clutch device, the clutch operating device comprising:
a drive part configured to automatically generate a driving force and transmit the driving force to the clutch device; and
an assist mechanism configured to assist the drive part in transmitting the driving force, the assist mechanism including a pressure part configured to generate a pressing force, and a toggle mechanism configured to convert the pressing force into an assist force which assists transmitting the driving force,
the assist force gradually increasing to change the clutch device from a power-blocking state to a power-transmitting state, and the driving force of the drive part and the assist force of the assist mechanism being output to the clutch device, the drive force not being transmitted through the toggle mechanism.

2. The clutch operating device recited in claim 1, wherein
the drive part includes an output member configured to output the driving force, and
the assist mechanism is configured to transmit the assist force to the clutch device either directly or through the output member.

3. The clutch operating device recited in claim 2, wherein the toggle mechanism includes
a first link member having, a first end portion and a second end portion,
the first link member disposed rotatably about the first end portion with respect to the drive part, and
a second link member configured to couple the second end portion of the first link member to either the clutch device or the output member.

4. The clutch operating device recited in claim 3, wherein the pressure part is configured to apply the pressing force to at least either of the first link member and the second link member.

5. The clutch, operating device recited in claim 3, wherein the pressure part is configured to press a coupled part between the first link member and the second link member.

6. The clutch operating device recited in claim 1, wherein the drive part is configured to generate the driving force gradually increasing from the power-blocking state to the power-transmitting state.

7. The clutch operating device recited in claim 6, wherein the toggle mechanism has a reduction ratio gradually increasing in changing the clutch device from the power blocked state to the power transmitted state.

* * * * *